United States Patent [19]

Grimm

[11] 4,415,690

[45] Nov. 15, 1983

[54] SUCCINIC ANHYDRIDE DERIVATIVES AS A SCORCH INHIBITOR FOR CARBOXYLATED RUBBERS

[75] Inventor: Donald C. Grimm, Tallmadge, Ohio

[73] Assignee: The Goodyear Tire & Rubber Company, Akron, Ohio

[21] Appl. No.: 379,243

[22] Filed: May 17, 1982

[51] Int. Cl.³ ............................................... C08K 5/15
[52] U.S. Cl. ..................................... 524/112; 524/432
[58] Field of Search ................................. 524/112, 432

[56] References Cited

U.S. PATENT DOCUMENTS

| | | | |
|---|---|---|---|
| 2,502,030 | 3/1950 | Scheiderbauer | 524/112 |
| 3,000,851 | 9/1961 | Schweitzer | 524/384 |
| 3,220,968 | 11/1965 | Dollhausen et al. | 524/509 |
| 3,304,348 | 2/1967 | Syrchek | 524/112 |
| 3,539,524 | 11/1970 | Wilkinson | 524/112 |
| 3,793,401 | 2/1974 | Nidd et al. | 524/112 |
| 3,796,679 | 3/1974 | Kujas | 524/112 |
| 3,880,821 | 4/1975 | Feniak | 525/210 |
| 3,933,740 | 1/1976 | Hopkins et al. | 524/112 |
| 3,954,913 | 5/1976 | Uebele et al. | 524/112 |
| 4,191,671 | 3/1980 | Kataoka et al. | 524/256 |

*Primary Examiner*—Joseph L. Schofer
*Assistant Examiner*—N. Sarofin
*Attorney, Agent, or Firm*—Alvin T. Rockhill

[57] ABSTRACT

Scorch (the premature cross-linking of an elastomer) is a problem that is often encountered in carboxylated rubbers. Succinic anhydride derivatives (alkenyl succinic anhydrides, alkyl succinic anhydrides, and their corresponding dicarboxylic acids) can be used to greatly improve the scorch resistance of carboxylated rubbers. These succinic anhydride derivatives can be distributed throughout a carboxylated rubber before or after coagulation using any procedure that will result in a thorough mixing to form a rubber composition with improved scorch resistance.

24 Claims, No Drawings

SUCCINIC ANHYDRIDE DERIVATIVES AS A SCORCH INHIBITOR FOR CARBOXYLATED RUBBERS

BACKGROUND OF THE INVENTION

Carboxylated rubbers (rubbers containing carboxyl groups in their polymer chain) are useful for many purposes. Carboxylic nitrile rubber (XNBR) is a terpolymer of butadiene, acrylonitrile, and methacrylic acid. This carboxyl modification of nitrile rubber (NBR) produces a material that has outstanding abrasion resistance. Metal oxide vulcanizates of carboxylic elastomers also have unusually high tensile strengths, superior ozone resistance, and elevated modulus values. Such carboxyl modification of a rubber typically involves the addition of about 0.75 percent to 15 percent by weight of an unsaturated carboxylic acid of the acrylic acid type to the monomer charge composition of the carboxylic rubber being synthesized.

These carboxylated elastomers can be vulcanized in a manner analogous to their uncarboxylated counterpart utilizing a sulfur curing agent. In addition to this, if a polyvalent radical and particularly divalent metals are available in the vulcanization recipe, the carboxyl groups in the polymer chain can take part in this cross-linking reaction. This cross-linking reaction is fast in the presence of divalent metals and scorch problems are often encountered. Even at room temperature, carboxylated rubbers will often cure in 48 hours or less in the presence of zinc oxide when uninhibited. Since scorch (the premature cross-linking of an elastomer) can render a rubber completely unworkable, it is necessary to control this cross-linking reaction between carboxyl groups on the polymer chain. This invention discloses the use of alkenyl succinic anhydride and alkyl succinic anhydride as agents to greatly improve the scorch resistance of carboxylated rubbers.

THE INVENTION

Alkenyl succinic anhydrides, alkyl succinic anhydrides and their corresponding dicarboxylic acids can be used as scorch inhibitors in any carboxylated rubber. This invention discloses an improved scorch resistant carboxylated rubber composition comprising: a carboxylated rubber and at least one succinic anhydride derivative selected from the group consisting of succinic anhydrides having the structural formula:

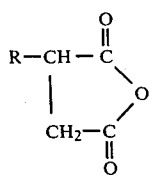

wherein R is an alkenyl moiety containing from 8 to 25 carbon atoms, inclusive; dicarboxylic acids having the structural formula:

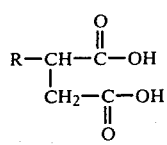

wherein R is an alkenyl moiety containing from 8 to 25 carbon atoms, inclusive; alkyl succinic anhydrides having the structural formula:

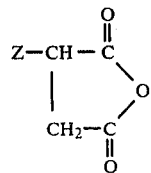

wherein Z is an alkyl moiety containing from 8 to 25 carbon atoms, inclusive; and dicarboxylic acids having the structural formula:

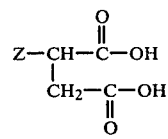

wherein Z is an alkyl moiety containing from 8 to 25 carbon atoms, inclusive, which is distributed throughout said carboxylated rubber composition as a scorch inhibitor. These carboxylated rubbers (elastomers) contain chain linkages derived from unsaturated carboxylic acids of the acrylic acid type. Some representative examples of unsaturated carboxylic acids of the acrylic acid type include acrylic acid, methacrylic acid, sorbic acid, β-acryloxypropanoic acid, ethacrylic acid, 2-ethyl-3-propyl acrylic acid, vinyl acrylic acid, cinnamic acid, maleic acid, fumaric acid, and the like. The rubbers for which these agents are useful as a scorch inhibitor generally contained from about 0.75 percent to 15 percent by weight chain linkages which are derived from unsaturated carboxylic acids.

The carboxylic rubbers can be synthesized using any conventional polymerization technique. Emulsion polymerization of carboxylated elastomers is generally preferred and is used almost exclusively in industrial production. This type of a synthesis generally utilizes a charge composition comprising water, monomers, an initiator, and an emulsifier (soap). Such polymerizations can be run over a very wide temperature range from about 0° C. to as high as 100° C. Very good results have been obtained when polymerizations are run at a temperature from about 5° C. to 60° C.

The amount of carboxylic monomer (unsaturated carboxylic acid of the acrylic acid type) incorporated in a carboxylated rubber may be varied over a wide range. The monomer charge ratio between the carboxylic monomer and the comonomers employed in a polymerization may also be varied over a very wide range. A typical monomer charge composition for a carboxylated nitrile rubber is 67 percent butadiene, 26 percent acrylonitrile, and 7 percent methacrylic acid (percentages are by weight). Some other monomers that may be copolymerized with a carboxylic monomer to form elastomers for which succinic anhydride derivatives are useful as a scorch inhibitor include styrene; isoprene; vinylidene monomers having one or more terminal $CH_2=C<$ groups; vinyl aromatics such as α-methylstyrene, bromostyrene, chlorostyrene, fluorostyrene, vinylphenol, 3-hydroxy-4-methoxystyrene, vinylanisole, β-nitrostyrene, and the like; α-olefins such as ethylene; vinyl halides, such as vinylbromide, chloroethane (vinylchloride), vinylfluoride, vinyliodide, 1,2-dibromoethane, 1,1-dichloroethylene (vinylidene chloride), 1,2-dichloroethylene, and the like; vinyl esters such as vinyl acetate; α,β-olefinically unsaturated nitriles, such as methacrylonitrile; α,β-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; α,β-olefinically unsaturated N-alkylol amides having the general structural formula:

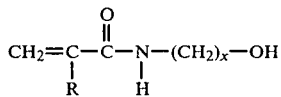

wherein R is a hydrogen atom or an alkyl group containing from 1 to 4 carbon atoms and x is an integer from 1 to 4 inclusive such as N-methylol acrylamide, N-ethylol acrylamide, N-propylol acrylamide, N-methylol methacrylamide, N-ethylol methacrylamide, and the like; vinyl pyridine; n-octyl methacrylate, dodecyl methacrylate, methyl ethacrylate, and ethylethacrylate; haloalkyl acrylates such as chloropropyl acrylate; methacrylates; hydroxyethylacrylate; and polyfunctional compounds such as ethylene glycol dimethacrylate, diethylene glycol diacrylate, divinylbenzene, alkenyl pentaerythritol, methylene-bis-acrylamide, and the like.

In the polymerization of unsaturated carboxylic acids, of the acrylic acid type with one or more of the abovementioned monomers, there can be competing or side reactions which take place. Therefore, the choice of reactants, process conditions, order of addition of reactants and the like, should be selected in order to produce a useful rubber containing carboxyl groups. The monomers employed and monomer ratios used in the charge composition for the polymerization should be selected in a manner that will produce a carboxylated elastomer. It should be noted that many combinations of the above-mentioned monomers will result in the polymerization of a nonelastomeric polymer. The carboxyl modified polymers which are generally preferred include carboxylated nitrile rubber, which is a copolymer of butadiene, acrylonitrile, methacrylic acid; terpolymers of methacrylic acid, styrene, and butadiene; copolymers of methacrylic acid and butadiene; copolymers of methacrylic acid and isoprene; terpolymers of acrylic acid, acrylonitrile, and butadiene; and terpolymers of methacrylic acid, vinylidene chloride, and butadiene.

The emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid, and the like; amine soaps of fatty acids such as those formed from ammonia, mono- and di-alkyl amines, substituted hydrazines, guanidine, and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester, or amide groups such as alkylbenzyl(polyethyleneoxy)alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC—CH_2—SO_3H$, wherein R is an alkyl group having from 1 to 20 carbon atoms such as dialkyl sulfosuccinates; ester salts with the general formula:

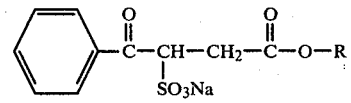

wherein R is an alkyl group having from 1 to 20 carbon atoms; alkarylsulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with thhe formula $RSO_3Na$, wherein R is an alkyl and the like; sulfonamides; sulfamido methylenesulfonic acids; rosin acids and their soaps; sulfonated derivatives of rosin and rosin oil; and lignin sulfonates, and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

The polymerization of these carboxylated rubbers may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butylperoxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Cumene hydroperoxide can be used as an initiator to obtain very good results in the polymerization of carboxylated nitrile.

The emulsion polymerization system used in the synthesis of carboxylated rubbers can be treated at the desired degree of conversion with shortstopping agents, such as hydroquinone. Typical shortstopping agents will not interfere with the action of succinic anhydride derivatives as scorch inhibitors. Typical stabilizing agents and standard antioxidants can also be added to the emulsion of a carboxylated rubber without interfering with the action of succinic anhydride derivatives as scorch inhibitors.

After the emulsion polymerization has been completed, many conventional coagulating techniques can be employed. Normally such latexes are coagulated with reagents which insure the preservation of the carboxyl groups of the elastomers as acidic moieties. Coagulation with acids or blends of salts with acids is usually very satisfactory. For example, sulfuric acid, hydrochloric acid, blends of sodium chloride with sulfuric acid, and blends of hydrochloric acid with methanol are very effective as coagulating agents for carboxylated rubber emulsions. Calcium chloride solutions which are free of calcium hydroxide have also been used as coagulants with great success.

After coagulation washing may be employed to remove excess soap and/or electrolyte from the carboxylated rubber. Sometimes washing is also useful in adjusting the pH of the carboxylated elastomer that has been synthesized. After washing, if it is desired, the elastomer can be dewatered. If it is desirable to do so, the carboxylated rubber can also be dried and baled after dewatering using conventional techniques.

Normally, a metal oxide (zinc oxide, magnesium oxide, copper oxide, calcium oxide or nickel oxide) usually zinc oxide, is mixed into a carboxylated rubber after it has been dried and baled. Usually from about 0.5 to 10 parts of the metaloxide per hundred parts rubber (phr) is employed. Excellent results are obtained using about 5 phr of zinc oxide. This process of mixing the zinc oxide into the rubber is usually carried out by utilizing a Banbury mixer; however, any other procedure that will adequately mix the zinc oxide with the carboxylated rubber can also be employed. Normally, it is advantageous to minimize the time period between the point when the zinc oxide is added and the time at which the carboxylated rubber will be vulcanized (cross-linked). By minimizing this time period the amount of time in which spontaneous cross-linking between carboxyl groups can occur is minimized. Since unwanted cross-linking (scorch) often occurs in processing equipment (sometimes due to heat buildup) before it is desired, the time at which the metal oxide is added is not a total solution to the problem.

By distributing (mixing) alkenyl succinic anhydrides, alkyl succinic anhydrides, and their corresponding dicarboxylic acids throughout a carboxylated rubber a scorch resistant carboxylic rubber composition is produced with the problem of premature cross-linking (scorch) being greatly reduced. These succinic anhydride derivatives can be mixed into dried rubber using any procedure that will result in a thorough mixing. Good results have been obtained by mixing alkenyl succinic anhydrides into dried rubber with a Banbury mixer. Alkenyl succinic anhydrides having the structural formula:

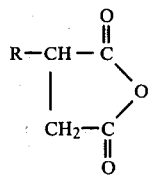

wherein R is an alkenyl moiety containing from 8 to 25 carbon atoms, inclusive, are very useful as scorch inhibitors for carboxylated rubbers. The dicarboxylic acids corresponding to these alkenyl succinic anhydrides which have a general structural formula:

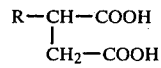

wherein R is an alkenyl moiety containing from 8 to 25 carbon atoms, inclusive, are also very effective as scorch inhibitors. These dicarboxylic acids are formed when alkenyl succinic anhydrides are added to water.

Mixtures of alkenyl succinic anhydrides with the general structural formula shown above wherein R is an alkenyl moiety containing from 12 to 17 carbon atoms have been used with excellent success as scorch inhibitors in carboxylated rubber. In such a mixture of alkenyl succinic anhydrides there will be a distribution of alkenyl succinic anhydride molecules containing varying numbers of carbon atoms in their R substituent groups ranging from 12 to 17, inclusive.

Alkyl succinic anhydrides which have the structural formula:

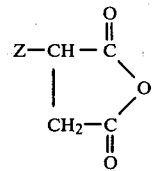

wherein Z is an alkyl moiety containing from 8 to 25 carbon atoms, inclusive, can also be mixed into dried rubber with a Banbury mixer to provide excellent scorch safety. Mixtures of alkyl succinic anhydride molecules containing varying numbers of carbon atoms in their Z substituent groups ranging from 8 to 25, inclusive, can also be mixed into carboxylated rubbers to provide excellent scorch resistance. The dicarboxylic acids corresponding to these alkyl succinic anhydrides are also very effective when added individually or as mixtures with varying Z substituents to carboxylated rubbers. All of these aforementioned succinic anhydride derivatives and their corresponding dicarboxylic acids can be used alone or as mixtures to provide scorch resistance when distributed throughout carboxylated rubbers. Alkyl succinic anhydrides (and their corresponding dicarboxylic acids) with the structural formula shown above wherein Z is an alkyl moiety containing from 12 to 17 carbon atoms, inclusive, can be employed to provide outstanding scorch safety for carboxylated rubbers.

Alkenyl succinic anhydrides, alkyl succinic anhydrides, and their corresponding dicarboxylic acids may also be mixed into the emulsion of a carboxylated rubber (prior to coagulation). By adding these succinic anhydride derivatives directly to the emulsion used in the polymerization of the rubber, excellent mixing will result. This procedure will provide excellent scorch safety, as is obtained when the succinic anhydride derivatives are mixed into dried rubber utilizing the Banbury mixer.

These succinic anhydride derivatives will provide excellent scorch safety for a carboxylated rubber at a concentration of about 5 parts per hundred of rubber (phr) by weight. It will usually be desirable to use lesser amounts of these agents since in lower concentrations they can also provide adequate scorch safety. It is contemplated that for most carboxylated rubbers a concentration of succinic anhydride derivatives from about 0.1 to about 1.5 phr would provide very satisfactory scorch resistance for most applications. The optimum amount of succinic anhydride derivatives needed will vary with the degree of carboxylation in the rubber being treated and with the processing conditions that will ultimately be employed in manufacturing the rubber into useful products.

This invention is illustrated by the following representative examples which are merely for the purpose of illustration and are not to be regarded as limiting the scope of the invention or the manner in which it may be practiced. Unless specifically indicated otherwise, parts and percentages are given by weight.

EXAMPLES 1 THROUGH 8

In order to demonstrate the superiority of succinic anhydride derivatives as scorch inhibitors when compared to other carboxylic acids and anhydrides a direct comparison between the scorch safety provided by a mixture of various alkenyl succinic anhydrides and numerous other carboxylic acids and anhydrides was experimentally made.

The mixture of alkenyl succinic anhydrides used in this comparison, hereinafter referred to as ASA, had the following structural formula:

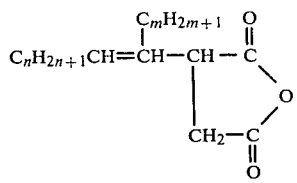

wherein m+n equals 12 to 17. In this mixture of alkenyl succinic anhydrides there is a distribution of alkenyl succinic anhydride molecules with values for m and n varying from 0 to 17, inclusive, and with the sum of m+n ranging from 12 to 17, inclusive. ASA is a liquid that is very soluble in most organic solvents, e.g. acetone, benzene, and petroleum either and is insoluble in water.

The structural formulas of the anhydrides and carboxylic acids used in these examples is shown below:

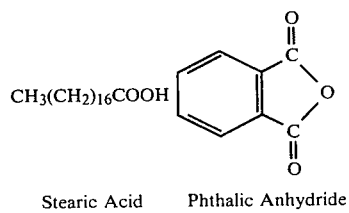

Stearic Acid  Phthalic Anhydride

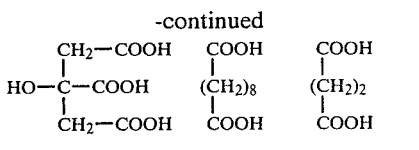

Citric Acid  Sebacic Acid  Succinic Acid

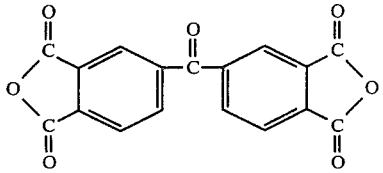

3,3',4,4'-Benzophenone-
tetracarboxylic Dianhydride
(BTDA)
or
4,4'-Carbonyldiphthalic Anhydride

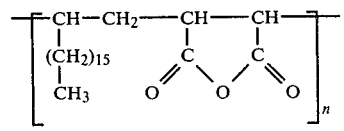

Gulf PA-18

Gulf PA-18 is a polymerized anhydride resin derived from 1-octadecene and maleic anhydride with a molecular weight of approximately 50,000.

A carboxylated nitrile rubber was used for these examples. The charge composition used in the synthesis of this carboxylated nitrile rubber was 200 parts deionized water, 0.42 parts potassium hydroxide, 2.46 parts dedecylbenzene sulfonic acid, 0.3 parts sodium acid phosphate, 0.1 parts tetrasodium ethylene diamine tetraacetate, 7 parts methacrylic acid, 0.45 parts tertiary dodecylmercaptan, 27 parts acrylonitrile, 0.03 parts cumene hydroperoxide, 66 parts butadiene, 0.02 parts sodium formaldehyde sulfoxylate, and 0.001 parts chelated ferrous sulfate. In the preparation of this charge composition the potassium hydroxide and dodecyl benzene sulfonic acid were premixed with 196 parts of deionized water and allowed to react for 15 minutes before adding the other components of the charge composition. The sodium formaldehyde sulfoxylate and chelated ferrous sulfate activators were premixed in a separate vessel in 4 parts of deionized water before they were added to the main reaction vessel and mixed with the other components in the charge composition.

This polymerization was run in a 75.7 liter reactor with agitation by two 15.2 cm Brumagim mixers at 300 rpm's (revolutions per minute). This polymerization was run at a temperature of 21° C. (70° F.). This temperature was maintained for 10 hours at which the solid content of the emulsion had reached 27.7 percent. At this point, the reaction had reached approximately 80 percent conversion and 0.1 parts of sodium nitrite was added as a shortstop. The emulsion was then degassed to remove unpolymerized butadiene monomer that was present. This degassing was accomplished by applying 50.8 cm. of vacuum to the emulsion for 10 hours.

Approximately 61.7 kilograms of latex was synthesized utilizing this polymerization recipe. 33.1 kilograms of this latex was mixed with emulsified Agerite Geltrol (2 active phr) and this blend was added to a solution of 18.1 kg of sodium chloride and 710 grams of concentrated sulfuric acid in 272.2 kg. of water which was at a temperature of 60° C. As this solution was vigorously agitated coagulation of the carboxylated nitrile rubber occurred. The rubber crumb was dipped out of this aqueous solution and dewatered with a dewatering screw down to about 10 percent water. The rubber was then oven dried to under 0.5 percent moisture content. 7.7 kilograms of dried rubber was produced by this process. A Banbury mixer was employed to add 50 parts of carbon black and 3 parts of various scorch inhibiting agents per 100 parts rubber (phr).

A Midget Banbury Mixer manufactured by Farrel Corporation was used for these examples. The Banbury was run at a speed of 84 rpm's and the rubber was mixed (by itself) for an initial breakdown period of one minute. After this initial breakdown period the carbon black and scorch inhibiting agent being tested was added and mixed for a period of 3 minutes. This technique made a very good mixture of the rubber, carbon black and scorch inhibiting agent being tested. Two parts tetramethyl thiuram disulfide, 1 part n-oxydiethylene benzothiazole-2-sulfinamide, 5 parts zinc oxide, and 0.3 parts sulfur per 100 parts rubber (phr) were mill mixed using a rolling bank into the rubber for one minute followed by 10 additional passes through the mill mixer.

These samples containing the different scorch inhibiting agents were then tested to determine their Mooney Scorch values. Mooney Scorch values for rubber samples containing each of the eight aforementioned scorch inhibiting agents to a 5 and 10 point rise in Mooney Scorch were determined at an operating temperature of 121° C. (250° F.) using ASTM Method D1077. The values that were determined for a 5 and 10 point rise in Mooney Scorch (designated as T-5 and T-10, respectively) are given in Table I.

TABLE I

| Example | Agent | T-5 (min.) | T-10 (min.) |
|---|---|---|---|
| 1 | ASA | 39 | >39 |
| 2 | Stearic Acid | 8.3 | 9.8 |
| 3 | Phthalic Anhydride | 2.3 | 2.9 |
| 4 | Citric Acid | 9.1 | 14.0 |
| 5 | Sebacic Acid | 6.2 | 7.9 |
| 6 | Succinic Anhydride | .6 | .8 |
| 7 | BTDA | 7.8 | 11.6 |
| 8 | PA-18 | 4.3 | 5.4 |

T-5 scorch values of 15 minutes or greater are generally considered necessary for adequate scorch safety. As can be determined by examining Table I, ASA is the only agent in the example that provides greater than 15 minutes of Mooney Scorch protection. When ASA was used as a scorch inhibiting agent it took over four times as long to reach a 5 point rise in Mooney Scorch than it did when any other agent was used as a scorch inhibitor. The time to a 10 point rise in Mooney Scorch when ASA was employed was over 2½ times as long as when any other scorch inhibiting agent tested was employed. It is readily apparent that ASA is vastly superior to any other carboxylic acid or anhydride as a scorch inhibitor.

Some specific compounds that are representative of those present in ASA include 1-dodecenyl succinic anhydride, 1-heptadecenyl succinic anhydride, 1-methyl-1-hexadecenyl succinic anhydride, 1-methyl-1-undecenyl succinic anhydride, 1-pentyl-1-heptenyl succinic anhydride, 1-heptyl-1-octenyl succinic anhydride, 1-butyl-1-decenyl succinic anhydride. The position of the double bond and side chains in alkenyl succinic anhydrides is unimportant and excellent scorch safety will be provided by such alkenyl succinic anhydrides containing from 12 to 17 carbon atoms. Some representative examples of such alkenyl succinic anhydrides include 1-pentyl-3-octenyl succinic anhydride, 1-butyl-6-decenyl succinic anhydride, 2,3,5-trimethyl-4-propyl-2-heptenyl succinic anhydride, 2,4-diethyl-6-dodecenyl succinic anhydride, 3,3-dipropyl-8-decenyl succinic anhydride. Good scorch safety is also provided by alkenyl succinic anhydrides containing from 8 to 25 carbon atoms. Some representative examples of such alkenyl succinic anhydrides include 2-octenyl succinic anhydride, 6-pentacosenyl succinic anhydride, 2-ethyl-4-hexenyl succinic anhydride, 3,3-dipropyl-7-heptadecenyl succinic anhydride. Alkyl succinic anhydrides containing from 12 to 17 carbon atoms are generally effective in providing scorch resistance for carboxylated rubbers. Good scorch safety is also provided by alkyl succinic anhydrides containing from 8 to 25 carbon atoms. Some representative examples of such alkyl succinic anhydrides include octyl succinic anhydride, nonyl succinic anhydride, dodecyl succinic anhydride, eicosyl succinic anhydride, pentacosyl succinic anhydride, 2,2-dibutyldecyl succinic anhydride, 4-ethyl-3,3-dimethylheptyl succinic anhydride, 4-isobutyl-2,5-dimethyltetradecyl succinic anhydride. Alkyl and alkenyl succinic anhydrides can be used alone or in any combination with other alkyl and alkenyl succinic anhydrides to provide scorch safety in carboxylated rubbers. The aforementioned representative examples of these alkyl and alkenyl succinic anhydrides are not meant to be limiting upon the group that will be effective in providing scorch resistance and certainly do not represent an exhaustive list of the compounds that can be employed.

While certain representative embodiments and details have been shown for the purpose of illustrating the invention, it will be apparent to those skilled in this art that various changes and modifications may be made therein without departing from the scope of the invention.

What is claimed is:
1. An improved scorch resistant carboxylic rubber composition comprising:
(a) a carboxylated rubber; and
(b) at least one succinic anhydride derivative selected from the group consisting of alkenyl succinic anhydrides having the structural formula:

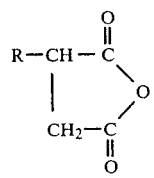

wherein R is an alkenyl moiety containing from 8 to 25 carbon atoms, inclusive; dicarboxylic acids having the structural formula:

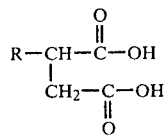

wherein R is an alkenyl moiety containing from 8 to 25 carbon atoms, inclusive; alkyl succinic anhydrides having the structural formula:

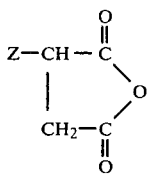

wherein Z is an alkyl moiety containing from 8 to 25 carbon atoms, inclusive; and dicarboxylic acids having the structural formula:

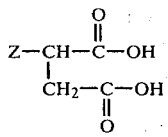

wherein Z is an alkyl moiety containing from 8 to 25 carbon atoms, inclusive; which is distributed throughout said carboxylated rubber composition as a scorch inhibitor.

2. An improved scorch resistant carboxylated rubber composition as specified in claim 1, wherein said R is an alkenyl moiety containing from 12 to 17 carbon atoms, inclusive.

3. An improved scorch resistant carboxylated rubber composition as specified in claim 1, wherein said Z is an alkyl moiety containing from 12 to 17 carbon atoms, inclusive.

4. An improved scorch resistant carboxylated rubber composition as specified in claim 2, wherein said R has the structural formula:

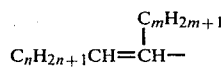

wherein m+n equals 12 to 17.

5. An improved scorch resistant carboxylated rubber composition as specified in claim 1, further comprising a metal oxide which is distributed throughout said carboxylated rubber composition.

6. An improved scorch resistant carboxylated rubber composition as specified in claim 5, wherein said metal oxide is a member selected from the group consisting of zinc oxide, magnesium oxide, copper oxide, calcium oxide, and nickel oxide.

7. An improved scorch resistant carboxylated rubber composition as specified in claim 6, wherein said metal oxide is zinc oxide.

8. An improved scorch resistant carboxylated rubber composition as specified in claim 1, wherein said carboxylated rubber is a member selected from the group consisting of terpolymers of methacrylic acid, styrene, and butadiene; terpolymers and methacrylic acid, acrylonitrile, and butadiene; terpolymers of acrylic acid, acrylonitrile, and butadiene; terpolymers of methacrylic acid, vinylidene chloride, and butadiene; copolymers of methacrylic acid and butadiene; and copolymers of methacrylic acid and isoprene.

9. An improved scorch resistant carboxylated rubber composition as specified in claim 8, wherein said carboxylated rubber is a terpolymer of methacrylic acid, acrylonitrile, and butadiene.

10. An improved scorch resistant carboxylated rubber composition as specified in claim 1, wherein the total concentration of said succinic anhydride derivatives less than about 5 phr.

11. An improved scorch resistant carboxylated rubber composition as specified in claim 10, wherein the total concentration of said succinic anhydride derivatives is about 0.1 to about 1.5 phr.

12. A process for improving the scorch resistance of a carboxylated rubber comprising, distributing throughout said carboxylated rubber a chemical agent selected from the group consisting of alkenyl succinic anhydrides having the structural formula:

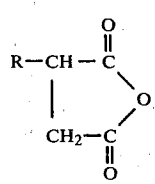

wherein R is an alkenyl moiety containing from 8 to 25 carbon atoms, inclusive; dicarboxylic acids having the structural formula:

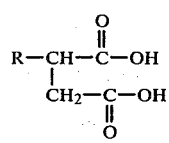

wherein R is an alkenyl moiety containing from 8 to 25 carbon atoms, inclusive; alkyl succinic anhydrides having the structural formula:

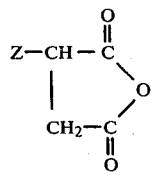

wherein Z is an alkyl moiety containing from 8 to 25 carbon atoms, inclusive; and dicarboxylic acids having the structural formula:

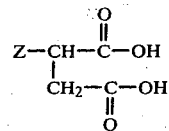

wherein Z is an alkyl moiety containing from 8 to 25 carbon atoms, inclusive; which is distributed throughout said carboxylated rubber composition as a scorch inhibitor.

13. A process for improving the scorch resistance of a carboxylated rubber as specified in claim 12, wherein said chemical agent is distributed throughout said carboxylated rubber by mixing said chemical agent into the emulsion of said carboxylated rubber prior to coagulation.

14. A process for improving the scorch resistance of a carboxylated rubber as specified in claim 12 wherein said agent is distributed throughout said carboxylated rubber which has been dried by mixing it into said carboxylated rubber utilizing a Banbury mixer.

15. A process for improving the scorch resistance of a carboxylated rubber as specified in claim 12 wherein said R is an alkenyl moiety containing from 12 to 17 carbon atoms, inclusive.

16. A process for improving the scorch resistance of a carboxylated rubber as specified in claim 12 wherein Z is an alkyl moiety containing from 12 to 17 carbon carbon atoms, inclusive.

17. A process for improving the scorch resistance of a carboxylated rubber as specified in claim 12 wherein said R has the structural formula:

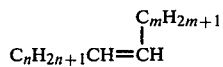

wherein m+n equals 12 to 17.

18. A process for improving the scorch resistance of a carboxylated rubber as specified in claim 12 further comprising a metal oxide which is distributed throughout said carboxylated rubber composition.

19. A process for improving the scorch resistance of a carboxylated rubber as specified in claim 18 wherein said metal oxide is a member selected from the group consisting of zinc oxide, magnesium oxide, copper oxide, calcium oxide and nickel oxide.

20. A process for improving the scorch resistance of a carboxylated rubber as specified in claim 18 wherein said metal oxide is zinc oxide.

21. A process for improving the scorch resistance of a carboxylated rubber as specified in claim 12 wherein said carboxylated rubber is a member selected from the group consisting of terpolymers of methacrylic acid, styrene, and butadiene; terpolymers of methacrylic acid, acrylonitrile and butadiene; terpolymers of acrylic acid, acrylonitrile, and butadiene; terpolymers of methacrylic acid, vinylidene chloride, and butadiene; copolymers of methacrylic acid and butadiene; and copolymers of methacrylic acid and isoprene.

22. A process for improving the scorch resistance of a carboxylated rubber as specified in claim 12 wherein said carboxylated rubber is a copolymer of methacrylic acid, acrylonitrile and butadiene.

23. A process for improving the scorch resistance of a carboxylated rubber as specified in claim 12, wherein the total concentration of said succinic anhydride derivatives is less than about 5 phr.

24. A process for improving the scorch resistance of a carboxylated rubber as specified in claim 23, wherein the total concentration of said succinic anhydride derivatives is about 0.1 to about 1.5 phr.

* * * * *

UNITED STATES PATENT OFFICE
CERTIFICATE OF CORRECTION

PATENT NO. : 4,415,690

DATED : November 15, 1983

INVENTOR(S) : Donald C. Grimm

It is certified that error appears in the above-identified patent and that said Letters Patent are hereby corrected as shown below:

Column 7, line 55, change "either" to "ether".

Column 12, line 6, insert --is-- before "less".

Signed and Sealed this

Twenty-second Day of May 1984

[SEAL]

Attest:

GERALD J. MOSSINGHOFF

Attesting Officer      Commissioner of Patents and Trademarks